(12) United States Patent
Pauli et al.

(10) Patent No.: US 11,125,309 B2
(45) Date of Patent: Sep. 21, 2021

(54) TRANSMISSION ARRANGEMENT, OVERALL TRANSMISSION AND MOBILE AGRICULTURAL MACHINE

(71) Applicant: ZF Friedrichshafen AG, Friedrichshafen (DE)

(72) Inventors: Thomas Pauli, Tiefenbach (DE); Stefan Igl, Vilshofen (DE); Thomas Oberbuchner, Passau (DE); Michael Haas, Hengersberg (DE); Marco Devoti, Schärding (AT)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 924 days.

(21) Appl. No.: 15/736,149

(22) PCT Filed: May 17, 2016

(86) PCT No.: PCT/EP2016/060963
§ 371 (c)(1),
(2) Date: Dec. 13, 2017

(87) PCT Pub. No.: WO2016/202515
PCT Pub. Date: Dec. 22, 2016

(65) Prior Publication Data
US 2018/0187760 A1 Jul. 5, 2018

(30) Foreign Application Priority Data
Jun. 16, 2015 (DE) .................... 10 2015 211 049.4

(51) Int. Cl.
*F16H 37/00* (2006.01)
*F16H 37/04* (2006.01)
(Continued)

(52) U.S. Cl.
CPC ............ *F16H 37/043* (2013.01); *F16H 3/085* (2013.01); *F16H 3/091* (2013.01); *F16H 3/093* (2013.01);
(Continued)

(58) Field of Classification Search
CPC ........ F16H 37/043; F16H 3/085; F16H 3/091; F16H 3/093; F16H 2200/0052;
(Continued)

(56) References Cited

U.S. PATENT DOCUMENTS 4,335,796 A * 6/1982 Smith .................... B60K 17/28
180/53.1
5,044,215 A 9/1991 Watanabe
(Continued)

FOREIGN PATENT DOCUMENTS

DE 75 09 828 12/1977
DE 26 45 907 A1 4/1978
(Continued)

OTHER PUBLICATIONS

International Search Report Corresponding to PCT/EP2016/060963 dated Jul. 18, 2016.
(Continued)

*Primary Examiner* — Victor L MacArthur
(74) *Attorney, Agent, or Firm* — Finch and Maloney, PLLC; Michaell J. Bujold; Jay Franklin

(57) ABSTRACT

A transmission assembly including a torque input shaft and a torque output shaft and input idler gears, input fixed gears and shift elements, each of which is associated with an input idler gear, are arranged on the torque input shaft, and output idler gears, output fixed gears and shift elements, each of which are associated with an output idler gear, are arranged on the torque output shaft, with the result that a plurality of different torque transmission paths from the torque input
(Continued)

shaft to the torque output shaft may be implemented. The transmission arrangement has an additional torque transmission path that may be implemented. The additional torque transmission path runs from the torque input shaft through a double gear to the torque output shaft. The transmission assembly can be included in a corresponding overall transmission which can be installed in an agricultural machine.

14 Claims, 8 Drawing Sheets

(51) Int. Cl.
*F16H 3/085* (2006.01)
*F16H 3/091* (2006.01)
*F16H 3/093* (2006.01)
*F16H 3/08* (2006.01)

(52) U.S. Cl.
CPC .............. *F16H 2003/0826* (2013.01); *F16H 2003/0936* (2013.01); *F16H 2200/003* (2013.01); *F16H 2200/0004* (2013.01); *F16H 2200/0026* (2013.01); *F16H 2200/0052* (2013.01); *F16H 2200/0078* (2013.01)

(58) Field of Classification Search
CPC ....... F16H 2200/0078; F16H 2200/003; F16H 2200/0004; F16H 2200/0026; F16H 2003/0826; F16H 2003/0936
See application file for complete search history.

(56) References Cited

U.S. PATENT DOCUMENTS

| | | | | |
|---|---|---|---|---|
| 5,239,887 | A | * | 8/1993 | Muller .................. B60K 17/08 74/15.4 |
| 5,301,564 | A | | 4/1994 | Willer |
| 5,465,630 | A | * | 11/1995 | Iwamoto ................ B60K 17/04 74/331 |
| 2012/0204675 | A1 | * | 8/2012 | Markl ..................... F16H 3/091 74/664 |

FOREIGN PATENT DOCUMENTS

| | | |
|---|---|---|
| DE | 69103293 T2 | 3/1995 |
| DE | 10 2005 046 898 A1 | 5/2007 |
| DE | 10 2009 027 064 A1 | 12/2010 |
| DE | 10 2013 200 646 A1 | 7/2014 |

OTHER PUBLICATIONS

Written Opinion Corresponding to PCT/EP2016/060963 dated Jul. 18, 2016.
German Search Report issued in corresponding German Patent Application No. 10 2015 211 049.4 dated Mar. 1, 2018.

* cited by examiner ring
TRANSMISSION ARRANGEMENT, OVERALL TRANSMISSION AND MOBILE AGRICULTURAL MACHINE This application is a National Stage completion of PCT/EP2016/060963 filed May 17, 2016, which claims priority from German patent application serial no. 10 2015 211 049.4 filed Jan. 16, 2015.

FIELD OF THE INVENTION

The invention relates to a transmission assembly, an overall transmission, as well as a corresponding agricultural machine.

BACKGROUND OF THE INVENTION

Overall transmissions, in particular, for agricultural machines, are known in the state of the art, which are composed of different operatively sequentially arranged sub-transmission units. Given the broad spectrum of tasks of agricultural machinery, such overall transmissions must accommodate a variety of needs. Thus, for example, tasks during field work, for example, as well as relatively long transport runs on the road must be equally ensurable. This requires a correspondingly large spread between the lowest and the highest gears. Furthermore, small geometric increments are required in agricultural machines between the individual gears which, in combination with the large spread, result in a high number of gears to be represented. As is known, this high number of gears to be represented can be implemented by a multi-group design of the overall transmission at an acceptable cost. Accordingly, an overall transmission of an agricultural machine is normally composed of a splitter transmission followed by a synchromesh transmission, and often a range transmission connected downstream thereof, a reversing gear and, optionally, a crawling gear transmission. In this configuration, a gear sequence of the overall transmission, which is consolidated by means of the splitter transmission by splitting each of the gear ratios of the synchromesh transmission by small increments of the splitter transmission and thus multiplying the number of representable gear ratios of the synchromesh transmission by the number of representable gear ratios of the splitter transmission, is predefined via the synchromesh transmission. However, as a result of the range transmission optionally connected downstream, the gear sequence is extended by translating the gear ratios of the synchromesh transmission into different gear ratio ranges via large gear ratio changes of the range transmission. With the reversing gear also frequently provided, it is then possible to represent a reverse direction of rotation and generally also to represent multiple reverse gears in combination with the other sub-transmission units. The crawling gear transmission provides a series of gear ratios, each of which permits a very high reduction in speed and thus enables extremely slow driving. However, since they are required only for special slow driving applications and are therefore comparatively expensive to purchase in terms of time and amount of work, they are only seldom incorporated in the overall transmission of an agricultural machine.

In this context, DE 26 45 907 describes a multiple ratio transmission. The multiple ratio transmission consists of a split group in the form of a finely graduated input group, the fixed gears of which are aligned on an input shaft driven directly by the main drive and the shift clutches and the idler gears of which are all aligned adjacent to one another on a first countershaft. The multiple ratio transmission further consists of a main group operatively connected downstream from the input group, having a drive shaft arranged axially and in the extension of the first countershaft, and of an output shaft drivable by the drive shaft via shift clutches and idler gears, as well as fixed gears meshing with the drive shaft. An intermediate gear is provided in the space between the input group and main group, which includes both a crawling gear wheel set as well as a reverse gear wheel set, the shift elements of which are successively arranged on the first gear shaft which supports the input group shift clutches. Both the secondary shaft of the reverse shift clutch as well as the drive shaft of the main group in this configuration reside coaxially and in the extension of the first gear shaft.

DE 10 2013 200 646 A1 discloses a motor vehicle transmission of multi-group design and a method for shifting the transmission. During shifting, an operative connection is established between a drive side and an output side of the motor vehicle transmission via a power-shiftable splitting group, and via a crawling gear group and a main group downstream from the splitting group. For this purpose, one of multiple different gear ratios is selected as a function of a control of multiple power shift clutches within the splitting group. To avoid the need to provide a main drive clutch now and to thereby save weight, as well as to improve the overall efficiency, the operative connection between the drive side and the output side is ultimately established at a power shift clutch of the splitting group involved in the shifting of the gear ratio to be selected. In this case, this power shift clutch guides a power flow between the drive side and the output side as a function of a load occurring in each case on the power shift clutch, either alone or in combination with at least one additional power shift clutch.

However, the known crawling gear transmissions have drawbacks, insofar as on the one hand their manufacture is complex and cost-intensive, while at the same time the full number of gears of such crawling gear transmissions is actually required and exhausted in their full functionality by only a small number of users. On the other hand, the complete absence of a crawling gear ratio unduly limits the possible uses of a corresponding motor vehicle or utility vehicle.

SUMMARY OF THE INVENTION

An object of the present invention is to propose a more versatile transmission assembly.

This object is achieved according to the invention by the transmission assembly as described below. Advantageous embodiments and refinements of the invention are also described below.

The invention relates to a transmission assembly, comprising a torque input shaft and a torque output shaft, wherein input idler gears, input fixed gears and shift elements, which are assigned in each case to one input idler gear, are arranged on the torque input shaft, wherein output idler gears, output fixed gears and shift elements, which are associated in each case with one output idler gear, are arranged on the torque output shaft, wherein the output idler gears and output fixed gears each mesh with one input idler gear or one input fixed gear, wherein the input idler gears are operatively couplable, via actuation of the associated shift elements, to the torque input shaft, and wherein the output idler gears are operatively couplable, via actuation of the associated shift elements, to the torque output shaft, with the result that a multiplicity of different torque transmission paths from the torque input shaft to the torque output shaft can be implemented. The transmission assembly according to the invention is distinguished by the fact that an additional torque transmission path can be implemented, wherein the additional torque transmission path extends from the torque input shaft, via a double gear, to the torque output shaft.

Thus, the invention relates to a transmission assembly, for example, a synchromesh transmission or a splitter transmission, which in each case implements a torque transmission path by actuating a shift element on the torque input shaft or on the torque input shaft, the force flow direction of which invariably runs from the torque input shaft to the torque output shaft. The transmission assembly according to the invention also has a double gear, via which a torque transmission path may also be guided. In the latter case, the force flow of the torque input shaft runs, via the double gear, to the torque output shaft, without reversing the direction of rotation of the torque output shaft.

The resulting advantage over known transmission assemblies is that because of the double gear, the transmission assembly has an additional, virtually arbitrarily definable transmission ratio at its disposal.

In particular, a known transmission assembly may, for example, be expanded with comparatively little effort by means of the double gear to form a transmission assembly according to the invention. This expands the potential range of uses of the known transmission assembly.

It should also be noted that the transmission assembly according to the invention may certainly comprise additional shafts in addition to the torque input shaft and the torque output shaft, the flow force direction nevertheless invariably running from the torque input shaft—optionally via additional shafts—to the torque output shaft.

The double gear with the first gear ring meshes preferably with a input idler gear or with a input fixed gear and with the second gear ring meshes preferably with an output idler gear or an output fixed gear or vice versa.

The transmission assembly according to the invention is used preferably in an agricultural machine or in a municipal utility vehicle.

The transmission assembly according to the invention is preferably a synchromesh transmission.

According to one preferred embodiment of the invention, it is provided that the double gear has a first gear ring and a second gear ring, wherein a diameter of the first gear ring in relation to a diameter of the second gear ring is formed in such a way that a crawling gear-like reduction of an input speed occurs when the additional torque transmission path is implemented. This has the advantage that a single crawling gear may be provided which, comparatively speaking, allows the vehicle to be driven extremely slowly. The velocity range provided by the single crawling gear in this case is sufficient to meet the requirements of most users. Thus, a complete and cost-intensive crawling gear transmission may be substituted by the single crawling gear or by the double gear without, in general, resulting in the loss of user-specific required capabilities of the overall transmission. Moreover, the cost for manufacturing the double gear is extremely low compared to a complete crawling gear transmission.

The term "crawling-like reduction" is understood in the context of the invention to mean a reduction ratio or transmission ratio in the sense of a speed reduction, as it is used for a crawling gear of a known crawling gear transmission. In this case, it is irrelevant according to the invention which specific crawling gear of the known crawling gear transmission is involved—all crawling gears and their reduction ratios or transmission ratios are equally suited according to the invention. The ratio of the diameter of the first gear ring to the diameter of the second gear ring in this case necessarily indicates the reduction ratio or transmission ratio achievable by the double gear. The person skilled in the art in this case is sufficiently familiar with crawling gears or crawling gear transmissions as well as their reduction ratios or transmission ratios in the sense of a speed reduction.

According to another preferred embodiment of the invention, it is provided that the additional torque transmission path also passes through an intermediate gear, which is arranged as a idler gear on the torque input shaft or on the torque output shaft, and meshes with the first gear ring or with the second gear ring of the double gear. This has the advantage that the double gear need no longer be arranged in the transmission assembly in such a way that it meshes with a first input idler gear or with an input fixed gear via the first gear ring and with an output idler gear or with an output fixed gear via the second gear ring or vice versa. Instead, the torque transmission path may now be guided, for example, from the torque input shaft to the intermediate gear, which is arranged, for example, on the torque output shaft, from the intermediate gear to the first gear ring of the double gear, from the first gear ring to the second gear ring of the double gear and from there to the torque output shaft. Thus, since the double gear meshes solely with gears that are arranged on the torque output shaft, this simplifies the arrangement of the double gear in the transmission assembly of the invention. By preferably utilizing the intermediate gear, the double gear may equally also mesh only with gears that are arranged on the torque input shaft. This simplifies the arrangement of the double gear in the transmission assembly according to the invention in an analogous manner. An additional advantage resulting from the utilization of the intermediate gear is an increased flexibility in the configuration of the ratio of the diameter of the first gear ring to the diameter of the second gear ring of the double gear, since the diameter of the intermediate gear may also be selected while already taking a desired reduction ratio or transmission ratio into consideration. This increases, therefore, the number of adjustable parameters for achieving a desired result, which ultimately results in greater design freedom.

According to one particularly preferred embodiment of the invention, it is provided that an input idler gear or an output idler gear is utilized as an intermediate gear. This advantageously eliminates additional costs, manufacturing input and assembly effort for the intermediate gear. Instead, an arbitrary input idler gear or output idler gear, suitable, in particular, with respect to its diameter, may be utilized as an intermediate gear.

It is preferably provided that the double gear does not mesh simultaneously via the two gear rings with an input fixed gear and an output fixed gear.

According to another preferred embodiment of the invention, it is provided that the double gear axially bridges at least one input idler gear or one output idler gear or one input fixed gear or one output fixed gear. This means, therefore, that the axial length of the double gear is selected in such a way that it does not mesh with two adjacent gears, for example, with an output idler gear and an output fixed gear, but axially bridges at least one gear. This has the advantage of facilitating a targeted selection of those gears, i.e., output idler gears, output fixed gears, moveable input gears or input fixed gears, which are particularly suitable for guiding the torque transmission path through the double gear with respect to the desired reduction ratio or transmission ratio.

According to another preferred embodiment of the invention, it is provided that the shift elements associated with the input idler gears and the output idler gears are able to synchronize. This has the advantage of enabling a shift of one meshed gear of the transmission assembly to another gear of the transmission assembly, even when the vehicle is being driven, for example, an agricultural machine, which includes the transmission assembly according to the invention. Thus, it is advantageously unnecessary to stop the vehicle prior to shifting to another gear. This simplifies the handling of the vehicle and expands its range of uses.

The term "synchronized shift elements" is understood in the context of the invention to mean that the shift elements enable the speed of the transmission elements to be drivably connected to one another, via a shift operation, to be equalized, for example, via mechanical friction.

The power shift elements preferably have friction surfaces for ensuring the synchronization capability, by means of their different speeds the transmission elements to be shifted may be synchronized.

According to one particularly preferred embodiment of the invention, it is provided that a shift element, which is associated with an input idler gear or output idler gear meshing with the intermediate gear, is not synchronized. A non-synchronized shift element is structurally simpler in design and more cost-effective as compared to a synchronized shift element. Since shifting into the crawling gear generally takes place when the vehicle is stopped, a synchronized shift element is not required in this case. This advantageously reduces the manufacturing input as well as the costs. The non-synchronized shift element may be designed, for example as a so-called sliding collar.

According to another preferred embodiment of the invention, it is provided that at least one gear shift packet is arranged on the torque input shaft and/or on the torque output shaft, which structurally combines shift elements of adjacent input idler gears and/or output idler gears. This enables a savings of installation space and serves to simplify the design of an associated shift actuation device.

According to another preferred embodiment of the invention, it is provided that a first output of the transmission assembly is operatively connected to a drivable rear axle of a vehicle. The transmission assembly in this case is designed specifically for use in a vehicle. The use, in particular, of the transmission assembly according to the invention in an agricultural machine, achieves an advantage with respect to the off-road performance and transmission of force to the ground, as a result of the driving of the rear axle due to the, in general, comparatively larger dimensioned tire equipment on the rear axle as opposed to the front axle.

It is particularly preferably provided that the first output is designed as a bevel gear, wherein the bevel gear is connectable to a ring gear of the drivable rear axle. A bevel gear enables an angularly offset arrangement of the axis of the bevel gear and of the axis of the ring gear, thereby increasing the structural stability in the design of the transmission assembly and of the rear axle. Moreover, a bevel gear allows for usually high reduction ratios or transmission ratios in the sense of a reduction of speed and an increase of the torque. This, in turn, facilitates the use of the transmission assembly according to the invention in a utility vehicle, in particular, in an agricultural machine.

According to another preferred embodiment of the invention, it is provided that a second output of the transmission assembly is shiftable via a power shift element. Thus, torque may also be shiftably provided for other purposes via the second output of the transmission assembly aside from the drive of the rear axle. By using a power shift element for shifting the second output of the transmission assembly, it is possible to flexibly connect or disconnect the second output at any time regardless of the load.

It is preferably provided that the power shift element is designed as an electrohydraulically actuated multi-plate clutch.

According to one particularly preferred embodiment of the invention, it is provided that the second output of the transmission assembly is operatively connectable to a drivable front axle of the vehicle. This has the advantage that the vehicle, in particular, the agricultural machine, has a shiftable all-wheel drive via the second output at its disposal, which may be connected or disconnected depending on the situation. The all-wheel drive of the vehicle may, for example, be connected when in operational use under high load for improving the off-road performance and the force transmission to the ground and may be disconnected during transport runs to save fuel.

According to one particularly preferred embodiment of the invention, it is provided that the transmission assembly is designed in such a way that the second output exhibits by means of a transmission ratio an output speed that differs from the first output. This facilitates the use of different tire equipment on the front axle as opposed to the rear axle of the vehicle. Such different tire equipment on the front axle as opposed to the rear axle represents the norm, for example, in the case of agricultural machines. The ratio of the output speed of the first output to the output speed of the second output preferably corresponds to the ratio of the rolling circumference of the tire equipment of the front axle to that of the tire equipment of the rear axle.

According to another preferred embodiment of the invention, it is provided that the transmission assembly comprises at least one intermediate gear or a reversing gear for reversing the direction of rotation. Thus, the transmission assembly advantageously enables a reversal of the rotational direction of the output speed or of the output torque and, therefore, also of the driving direction of the vehicle.

The invention also relates to an overall transmission for an agricultural machine, comprising a transmission assembly according to the invention. The use of the transmission assembly according to the invention in the overall transmission results in the advantages previously described in connection with the transmission assembly according to the invention.

According to one preferred embodiment of the invention, it is provided that the overall transmission further comprises a power take-off [PTO] shaft transmission, which has a shared PTO shaft stub for PTO shaft operation and a ground-speed PTO shaft operation. This has the advantage that by selecting a respectively required operating mode, the PTO shaft stub may be used either as PTO shaft or also as a ground-speed PTO shaft. This therefore eliminates the need to maintain an additional auxiliary output transmission if more than just one single operating mode of the PTO shaft stub is desired. This saves manufacturing costs, weight and installation space. The operating modes in this case are selectable, for example, by suitably actuating the corresponding shift elements in the overall transmission, wherein an operative connection is established between the PTO shaft stub and a PTO shaft transmission module of the overall transmission when the PTO shaft stub is operated as a PTO shaft, and wherein an operative connection is established between the PTO shaft stub and a ground-speed PTO shaft transmission module of the overall transmission when the PTO shaft stub is operated as a ground-speed PTO shaft.

The invention further relates to an agricultural machine, comprising an overall transmission according to the invention. The use of the overall transmission according to the invention results in the advantages previously described in connection with the overall transmission according to the invention.

BRIEF DESCRIPTION OF THE DRAWINGS

The invention is explained by way of example below with reference to embodiments depicted in the figures, in which.

DETAILED DESCRIPTION OF THE PREFERRED EMBODIMENTS

Figure 1:
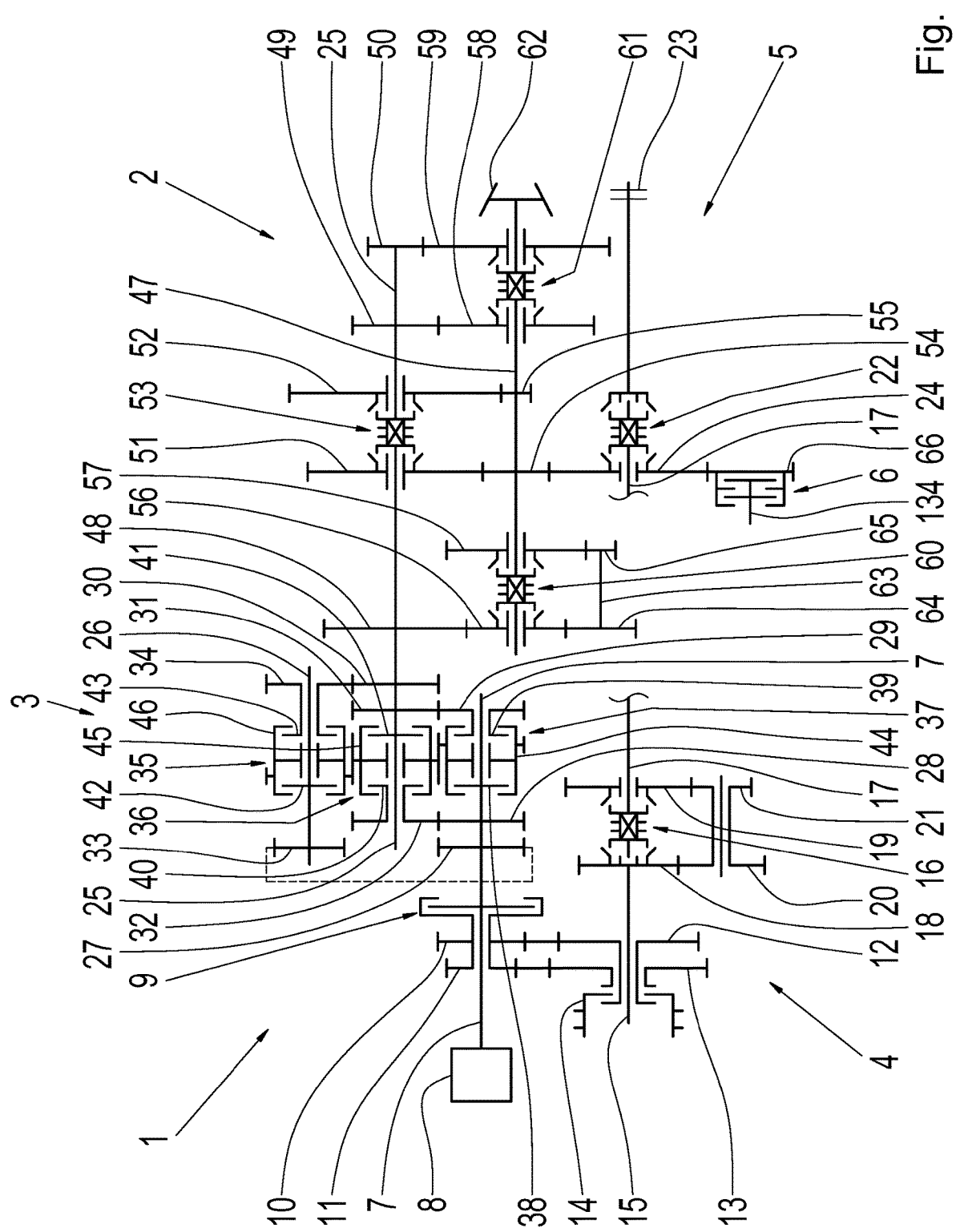
FIG. 1 schematically shows a first embodiment of an overall transmission according to the invention, comprising a transmission assembly according to the invention, FIG. 2 schematically shows a second embodiment of an overall transmission according to the invention, comprising a transmission assembly according to the invention, FIG. 3 schematically shows a third embodiment of an overall transmission according to the invention, comprising a transmission assembly according to the invention, FIG. 4 schematically shows a fourth embodiment of an overall transmission according to the invention, comprising a transmission assembly according to the invention, FIG. 5 schematically shows a fifth embodiment of an overall transmission according to the invention, comprising a transmission assembly according to the invention, FIG. 6 schematically shows a sixth embodiment of an overall transmission according to the invention, comprising a transmission assembly according to the invention, FIG. 7 schematically shows a possible embodiment of an overall transmission according to the invention, and FIG. 8 schematically shows an agricultural machine, comprising an overall transmission according to the invention.

Identical objects, function units and comparable components are identified by the same reference numerals throughout the figures. These objects, function units and comparable components are identically designed in terms of their technical features, unless explicitly or implicitly indicated otherwise from the description.

FIG. 1 schematically shows a first embodiment of an overall transmission 1 according to the invention, comprising a transmission assembly 2 according to the invention, a splitter transmission 3 and a PTO shaft transmission, which consists of a PTO shaft transmission module 4 and a ground-speed PTO shaft transmission module 5. The overall transmission 1 further comprises a power shift element 6. The overall transmission 1 depicted in the example is designed for use in an agricultural machine (not depicted). The transmission assembly 2 according to the invention represents a synchromesh transmission 2 within the overall transmission 1.

The overall transmission 1 is driven via a drive shaft 7 by a drive unit 8, which is designed, for example, as an internal combustion engine 8. A power shift element 9 of the PTO shaft transmission module 4 designed as a wet multi-plate clutch 9 is arranged on the drive shaft 7, which is able to establish and to release an operative connection of idler gears 10 and 11 with the drive shaft 7. The idler gears 10 and 11 mesh with idler gears 12 and 13. The meshing of the idler gears 10 and 11 with the idler gears 12 and 13 is depicted by lines in FIG. 1. In contrast to the idler gears 10 and 11, which are designed as an idler double gear, the idler gears 12 and 13 are single idler gears. Each of the idler gears 12 and 13 is operably couplable to a PTO shaft 15 by means of a sliding collar 14. The sliding collar 14 also allows for a neutral position, in which none of the idler gears 12 and 13 are operably coupled to the PTO shaft 15. The PTO shaft 15 is directly operably couplable to an additional PTO shaft 17 or indirectly operably couplable via a fixed gear 18 and an idler gear 19 as well as idler gears 20 and 21 by means of a synchronizable gear shift packet 16, which structurally combines the PTO shaft 15 and the shift elements associated with the movable wheel 19. The additional PTO shaft 17 extends axially further to a gear shift packet 22, which is already a component of the ground-speed PTO module 5. For the sake of clarity, the second PTO shaft 17 is depicted discontinuously in the representation of FIG. 1. The gear shift packet 22 in this case is structurally identical to the gear shift packet 16. To ensure the synchronization capability, the gear shift packets 16 and 22 each have friction surfaces, via which the speeds may be synchronized. The gear shift packet 22 enables an operative connection of the second PTO shaft 17 with a PTO shaft stub 23 on the one hand, and an operative connection of a idler gear 24 with the PTO shaft stub 23 on the other hand. The PTO shaft stub 23 is operated in the PTO shaft operation if the gear shift packet 22 establishes an operative connection of the additional PTO shaft with the PTO shaft stub 23. In this operating mode, it is possible to represent a total of four different gear ratios, for example, the gear ratios "540", "540E", "1000" and "1000E", which are standardized PTO shaft ratios, via the idler gears 10, 11, 12, 13, 19, 20 and 21 described, as well as via the fixed gear 18. If, however, the gear shift packet 22 establishes an operative connection of the idler gear 24 to the PTO shaft stub 23, the PTO shaft stub 23 is then operated in the ground-speed PTO shaft operation. This operating mode, for example, only allows for the representation of one single gear ratio.

The splitter transmission 3 comprises, for example, the drive shaft 7, a torque input shaft 25, which extends from the synchromesh transmission 2 into the splitter transmission 3, and a countershaft 26. Fixed gears 27 and 28, as well as an idler gear 29 are arranged on the drive shaft 7. Fixed gears 30 and 31 as well as a idler gear 32 are arranged on the torque input shaft 25. A fixed gear 33 as well as an idler gear 34 are arranged on the countershaft 26. The fixed gears 27 and 33, for example, mesh with one another, which is illustrated by the dashed line. The splitter transmission 3 further comprises three power-shiftable multi-plate clutches 35, 36 and 37, each of which is arranged on the countershaft 26, on the torque input shaft 25 and on the drive shaft 7, respectively. The multi-plate clutches 35, 36 and 37 each consist of two inner plate supports 38, 39, 40, 41, 42 and 43, and of a clutch bell 44, 45 and 46. The clutch bells 44, 45 and 46 also have external teeth, via which the clutch bell 45 meshes with the clutch bell 44 and the clutch bell 46. With this design of the splitter transmission 3, it is possible, for example, to provide six power-shiftable forward gears and three power-shiftable reverse gears. According to the exemplary embodiment shown in FIG. 1, the splitter transmission 3 also has the function of a main transmission clutch, i.e., the force flow from the drive unit 8 to the synchromesh transmission 2 may be interrupted by the splitter transmission 3, thus making it possible to shift a selected gear of the synchromesh transmission 2. To interrupt the force flow, the multi-plate clutches 35, 36 and 37, for example, are each shifted briefly into a neutral position. This is possible, because the drive unit 8, for example, has an only comparatively low output of less than 140 hp.

The transmission assembly 2 according to the invention designed as a synchromesh transmission 2 comprises the torque input shaft 25 and a torque output shaft 47. Input fixed gears 48, 49 and 50 as well as input idler gears 51 and 52 are arranged on the torque input shaft 25. The input idler gears 51 and 52 are associated with a synchronizable gear shift packet 53, via the actuation of which one or none of the input idler gears 51 and 52 is selectively operably couplable to the torque input shaft 25. Output fixed gears 54 and 55 as well as output idler gears 56, 57, 58 and 59 are arranged on the torque output shaft 47. In this case, the output idler gears 56 and 57 are associated with a synchronizable gear shift packet 60 and the output idler gears 58 and 59 are associated with a synchronizable gear shift packet 61. One or none of the output idler gears 56 and 57 or 58 and 59 is selectively operably couplable to the torque output shaft 47 via actuation of the gear shift packet 60 or the gear shift packet 61. Thus, the synchromesh transmission 2 enables via the input fixed gears 48, 49 and 50, the input idler gears 51 and 52, the output fixed gears 54 and 55, as well as the output idler gears 56, 58 and 59 the representation of a total of five different torque transmission paths, which corresponds to five different gear ratios. The gear shift packets 53, 60 and 61 are structurally identical to the gear shift packets 16 and 22 previously described. One output 62 of the torque output shaft 47 is designed as a bevel wheel gear 62 and is connected, for example, to a drivable rear axle (not shown) of the agricultural machine. The synchromesh transmission 2 also comprises a double gear 63 having a first gear ring 64 and a second gear ring 65, wherein a diameter of the first gear ring 64 in relation to a diameter of the second gear ring 65 is designed in such a way that an additional torque transmission path may be implemented with a crawling-like reduction of an input speed. The first gear ring 64 meshes with the output idler gear 56 and the second gear ring 65 meshes with the output idler gear 57. An additional torque transmission path, which runs, for example, from the torque input shaft 25 via the input fixed gear 48, the output idler gear 56, the double gear 63 and the output idler gear 57 to the torque output shaft 47 is implemented when activating the gear shift packet 60 in such a way that an operable coupling of the output idler gear 57 with the torque output shaft 47 is established, is implemented. This additional torque transmission path represents a crawling gear.

The output idler gear 56, for example, has a dual function, since on the one hand it serves as an output idler gear 56 in the state coupled with the torque output shaft 47 for providing a synchronous drive and, on the other hand, as an intermediate gear 56 in the uncoupled state, via which the additional torque transmission path runs to the double gear 63.

The power shift element 6 meshes with the idler gear 24 via a fixed gear 66 and, when it is actuated, enables the shifting, i.e., the connection or the disconnection, of a second output 134, for example, of a front-wheel drive of the agricultural machine. Since the tires of the front wheels of an agricultural machine normally has a smaller rolling circumference than the tires of the rear wheels, the transmission assembly 2 is designed in such a way that the second output 134 exhibits by means of a transmission ratio an output speed that differs from the first output 62. The ratio of the output speed of the second output 134 to the output speed of the first output 62 corresponds in this case to the ratio of the rolling circumference of the rear wheel tires to the rolling circumference of the front wheel tires.

It should also be emphasized that, instead of coupling to a splitter transmission 3, a PTO shaft transmission module 4 and a ground-speed PTO shaft transmission module 5, the transmission assembly 2 according to the invention, alternatively to the representation shown in FIG. 1, may also be coupled to only one single or to only two of the aforementioned transmission units, i.e., to the splitter transmission 3, to the PTO shaft transmission module 4 or to the ground-speed PTO shaft transmission module 5. It is also possible and preferred, to combine the transmission assembly 2 according to the invention with one or multiple transmission units other than the three aforementioned transmission units to form an overall transmission, for example, with a reversing gear unit. However, the use of the transmission assembly 2 alone with no additional transmission units in a vehicle is also possible and preferred.

Figure 2:
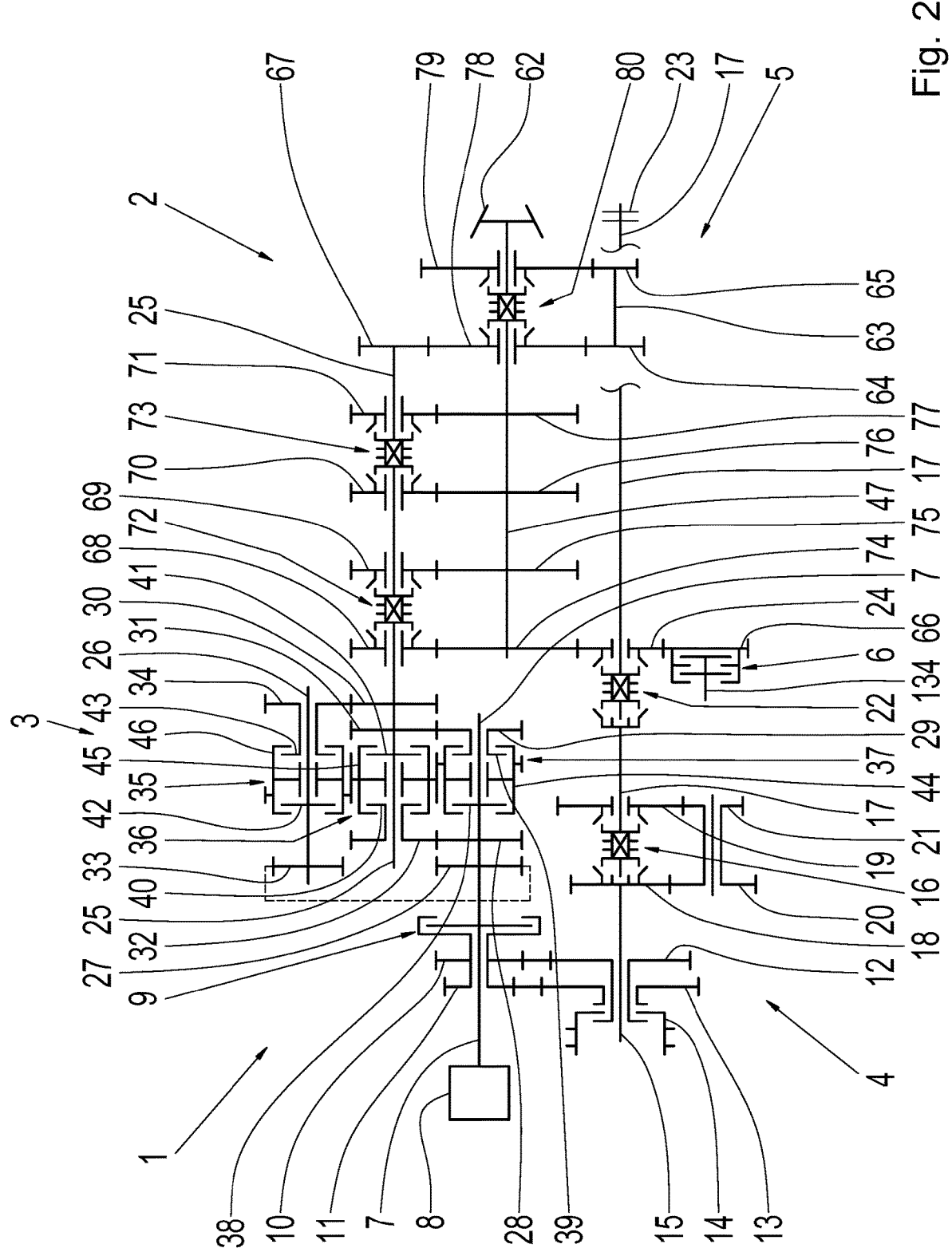

FIG. 2 schematically shows a second embodiment of an overall transmission 1 according to the invention, comprising a transmission assembly 2 according to the invention, a splitter transmission 3 and a PTO shaft transmission, which consists of a PTO shaft transmission module 4 and a ground-speed PTO shaft transmission module 5. The overall transmission 1 further comprises a power shift element 6. The overall transmission 1 depicted is designed, for example, for use in a municipal utility vehicle (not shown). The transmission assembly 2 according to the invention represents a synchromesh transmission 2 within the overall transmission 1. The overall transmission 1 shown by way of example in FIG. 2 differs from the overall transmission 1 shown in FIG. 1 as a result of the design of the synchromesh transmission 2.

The transmission assembly 2 according to the invention designed as a synchromesh transmission 2 comprises, for example, the torque input shaft 25 and the torque output shaft 47. An input fixed gear 67 as well as input idler gears 68, 69, 70 and 71 are arranged on the torque input shaft 26. The input idler gears 68 and 69, respectively 70 and 71 in this case are associated pairwise with shared synchronizable gear shift packets 72 and 73, via the actuation of which one or none of the input idler gears 68 and 69, respectively, 70 and 71, is selectively operatively couplable to the torque input shaft 25. Output fixed gears 74, 75, 76, and 77 as well as output idler gears 78 and 79 are arranged on the torque output shaft 47. In this case, the output idler gears 78 and 79 are associated pairwise with a shared synchronizable gear shift packet 80. One or none of the output idler gears 78 and 79 is selectively operably couplable to the torque output shaft 47 via actuation of the gear shift packet 80. Thus, the synchromesh transmission 2, via the input fixed gear 67, the input idler gears 68 69, 70 and 71, the output fixed gears 74, 75, 76 and 77, as well as the output idler gear 78, enables the representation of a total of five different torque transmission paths, which corresponds to five different synchronous gears. The gear shift packets 72, 73 and 80 are structurally identical to the previously described gear shift packets 16 and 22. One output 62 of the torque output shaft 47 is designed as a bevel wheel gear 62 and is connected, for example, to a driveable rear axle (not shown) of the municipal utility vehicle. The synchromesh transmission 2 further comprises a double gear 63 having a first gear ring 64 and a second gear ring 65, wherein a diameter of the first gear ring 64 in relation to a diameter of the second gear ring 65 is designed in such a way that an additional torque transmission path is achievable with a crawling-like reduction of an input speed. The first gear ring 64 meshes with the output idler gear 78 and the second gear ring 65 meshes with the output idler gear 79. An additional torque transmission path, which runs, for example, from the torque input shaft 25 via the input fixed gear 67, the output idler gear 78, the double gear 63 and the output idler gear 79 to the torque output shaft, is implemented when the gear shift packet 80 is actuated in such a way that an operable coupling of the output idler gear 79 to the torque output shaft 47 is established. This additional torque transmission path represents a crawling gear.

The output idler gear 78, for example, has a dual function since, on the one hand, it serves as an output idler gear 78 in the state coupled to the torque output shaft 47 for providing a synchronous gear and, on the other hand, serves as an intermediate gear 78 in the uncoupled state, from which the additional torque transmission path runs to the double gear 63.

In this case as well, it should be emphasized that, instead of to a splitter transmission 3, a PTO shaft transmission module 4 and a ground-speed PTO shaft transmission module 5, the transmission assembly 2 according to the invention, alternatively to the representation shown in FIG. 2, may also be coupled to only one single or to only two of the aforementioned transmission units, i.e., to the splitter transmission 3, to the PTO shaft transmission module 4 or to the ground-speed PTO shaft transmission module 5. It is also possible and preferred, to combine the transmission assembly 2 according to the invention with one or multiple transmission units other than the three aforementioned transmission units to form an overall transmission, for example, with a reversing gear unit. However, the use of the transmission assembly 2 alone with no additional transmission units in a vehicle is also possible and preferred.

Figure 3:
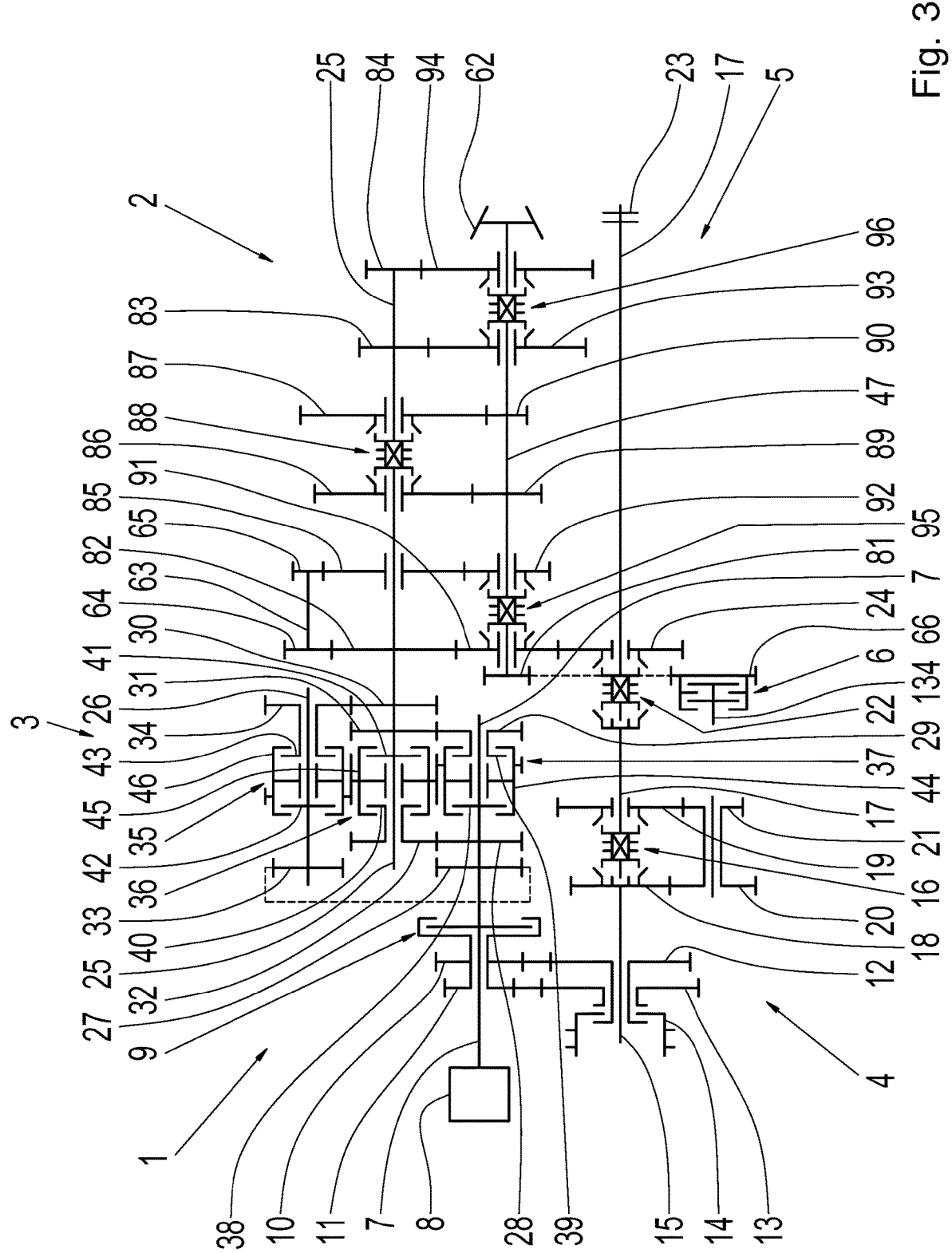

FIG. 3 schematically shows a third embodiment of an overall transmission 1 according to the invention, comprising a transmission assembly 2 according to the invention, a splitter transmission 3 and a PTO shaft transmission, which consists of a PTO shaft transmission module 4 and a ground-speed PTO shaft transmission module 5. The overall transmission 1 further comprises a power shift element 6. The overall drive 1 depicted is designed, for example, for use in an agricultural machine (not shown). The transmission assembly 2 according to the invention represents a synchromesh transmission 2 within the overall transmission 1. The overall transmission shown 1 by way of example in FIG. 3 differs from the overall transmission 1 shown in FIG. 1 as a result of the design of the synchromesh transmission 2 and of the arrangement of the power shift element 6. The power shift element 6, for example, is not operatively connected to a idler gear of the additional PTO shaft 17, but to an output fixed gear 81 of the torque output shaft 47. The meshing of the output fixed gear 81 with the fixed gear 66 is illustrated by a dashed line.

The transmission assembly 2 according to the invention designed as a synchromesh transmission 2 comprises, for example, the torque input shaft 25 and the torque output shaft 47. Input fixed gears 82, 83 and 84 as well as input idler gears 85, 86 and 87 are arranged on the torque input shaft 25. The input idler gears 86 and 87 in this case are associated pairwise with a shared synchronizable gear shift packet 88, via the actuation of which on or none of the input fixed gears 86 and 87 is selectively operably couplable to the torque input shaft 25. Output fixed gears 81, 89 and 90, as well as output idler gears 91, 92, 93 and 94 are arranged on the torque output shaft 47. The output idler gears 91 and 92, respectively 93 and 94 in this case are associated pairwise with a shared synchronizable gear shift packet 95 and 96. One or none of the output idler gears 91, 92, 93 and 94 is selectively operatively couplable to the torque output shaft 47 via an actuation of the gear shift packet 95 and 96. Thus, the synchromesh transmission 2, via input fixed gears 82, 83 and 84, the input idler gears 86 and 87, the output fixed gears 89 and 90 as well as the output idler gears 91, 93 and 94, enables the representation of a total of five different torque transmission paths, which corresponds to five different synchronous gears. The gear shift packets 88, 95 and 96 are structurally identical to the previously described gear shift packets 16 and 22. One output 62 of the torque output shaft 47 is designed as a bevel wheel gear 62 and is connected, for example, to a driveable rear axle (not shown) of the agricultural machine. The synchromesh transmission 2 further comprises a double gear 63 having a first gear ring 64 and a second gear ring 65, wherein a diameter of the first gear ring 64 in relation to a diameter of the second gear ring 65 is designed in such a way that an additional torque transmission path is achievable with a crawling-like reduction of an input speed. The first gear ring 64, for example, meshes with the input fixed gear 82 and the second gear ring 65 meshes with the intermediate gear 85 designed as input idler gear 85. In turn, the intermediate gear 85 meshes with output idler gear 92. An additional torque transmission path, which extends, for example, from the torque input shaft 25 via the input fixed gear 82, the double gear 65, the intermediate gear 85 and the output idler gear 92 to the torque output shaft 47, is implemented when the gear shift packet 92 is actuated in such a way that an operative coupling of the output idler gear 92 with the torque output shaft 47 is established. This additional torque transmission path represents a crawling gear.

In this case as well, it should be emphasized that, instead of to a splitter transmission 3, a PTO shaft transmission module 4 and a ground-speed PTO shaft transmission module 5, the transmission assembly 2 according to the invention, alternatively to the representation shown in FIG. 3, may also be coupled to only one single or to only two of the aforementioned transmission units, i.e., to the splitter transmission 3, to the PTO shaft transmission module 4 or the ground-speed PTO shaft transmission module 5. It is also possible and preferred, to combine the transmission assembly 2 according to the invention with one or multiple transmission units other than the three aforementioned transmission units to form an overall transmission, for example, with a reversing gear unit. However, the use of the transmission assembly 2 alone with no additional transmission units in a vehicle is also possible and preferred.

Figure 4:
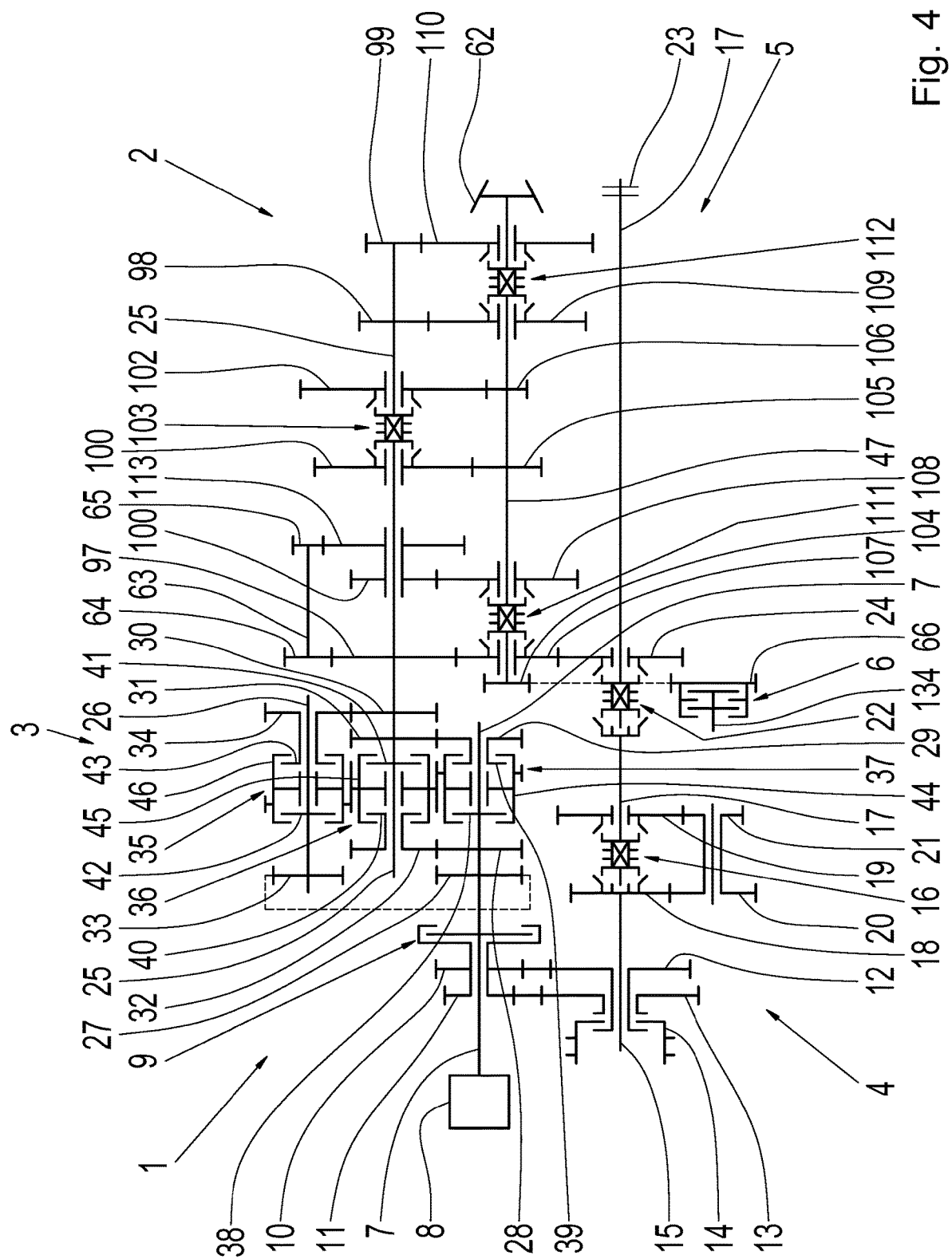

FIG. 4 schematically shows a fourth embodiment of an overall transmission 1 according to the invention, comprising a transmission assembly 2 according to the invention, a splitter transmission 3 and a PTO shaft transmission, which consists of a PTO shaft transmission module 4 and a ground-speed PTO shaft transmission module 5. The overall transmission 1 further comprises a power shift element 6. The overall drive 1 depicted is designed, for example, for use in a municipal utility vehicle (not shown). The transmission assembly 2 according to the invention represents a synchromesh transmission 2 within the overall transmission 1. The overall transmission 1 shown by way of example in FIG. 4 differs from the overall transmission 1 shown in FIG. 1 solely as a result the design of the synchromesh transmission 2.

The transmission assembly 2 according to the invention designed as a synchromesh transmission 2 comprises, for example, the torque input shaft 25 and the torque output shaft 47. Input fixed gears 97, 98 and 99 as well as input idler gears 100, 113, 101 and 102 are arranged on the torque input shaft 25. The input idler gears 101 and 102 in this case are associated pairwise with a shared synchronizable gear shift packet 103, via actuation of which one or none of the input fixed gears 101 and 102 is selectively operably couplable to the torque input shaft 25. Output fixed gears 104, 105 and 106, as well as output idler gears 107 108, 109 and 110 are arranged on the torque output shaft 47. The output idler gears 107 and 108, respectively 109 and 110 in this case are associated pairwise with a shared synchronizable gear shift packet 111 and 112. One or none of the output idler gears 107, 108, 109 and 110 is selectively operatively couplable to the torque output shaft 47 via actuation of the gear shift packet 111 and 112. Thus, the synchromesh transmission 2, via input fixed gears 97, 98 and 99, the input idler gears 101 and 102, the output fixed gears 105 and 106 as well as the output idler gears 107, 108, 109 and 110, enables the representation of a total of five different torque transmission paths, which corresponds to five different synchronous gears. The gear shift packets 103, 111 and 112 are structurally identical to the previously described gear shift packets 16 and 22. One output 62 of the torque output shaft 47 is designed as a bevel wheel gear 62 and is connected, for example, to a driveable rear axle (not shown) of the municipal utility vehicle. The synchromesh transmission 2 further comprises a double gear 63 having a first gear ring 64 and a second gear ring 65, wherein a diameter of the first gear ring 64 in relation to a diameter of the second gear ring 65 is designed in such a way that an additional torque transmission path is achievable with a crawling-like reduction of an input speed. The first gear ring 64, for example, meshes with the input fixed gear 97 and the second gear ring 65 meshes with the intermediate gear 113 designed as input idler gear 113. The intermediate gear 113, together with input idler gear 100, is designed for example as a double gear, which results in a further reduction or transmission ratio in the sense of a speed reduction of the input speed due to the size ratios and diameter ratios of the input idler gears 100 and 113 schematically depicted in FIG. 4. The input idler gear 100 also represents an intermediate gear 100.

An additional torque transmission path, which extends, for example, from the torque input shaft 25 via the input fixed gear 97, the double gear 63, the intermediate gears 113 and 110 and the output idler gear 108 to the torque output shaft 47, is implemented when the gear shift packet 111 is actuated in such a way that an operative coupling of the output idler gear 108 with the torque output shaft 47 is established. This additional torque transmission path represents a crawling gear.

In contrast to the previously described exemplary embodiments, however, the double gear 63 is designed, for example, in such a way that it axially bridges the input idler gear 100. This means, the double gear 63 meshes with the gears adjacent to the input idler gear 100, namely the input fixed gear 97 and the intermediate gear 113, but not with the input idler gear 100, since it bridges or axially straddles the input idler gear 100. Thus, the double gear 63 meshes with two non-adjacent gears.

In this case as well, it should be emphasized that, instead of to a splitter transmission 3, a PTO shaft transmission module 4 and a ground-speed PTO shaft transmission module 5, the transmission assembly 2 according to the invention, alternatively to the representation shown in FIG. 4, may also be coupled to only one single or to only two of the aforementioned transmission units, i.e., to the splitter transmission 3, to the PTO shaft transmission module 4 or the ground-speed PTO shaft transmission module 5. It is also possible and preferred, to combine the transmission assembly 2 according to the invention with one or multiple transmission units other than the three aforementioned transmission units to form an overall transmission, for example, with a reversing gear unit. However, the use of the transmission assembly 2 alone with no additional transmission units in a vehicle is also possible and preferred.

Figure 5:
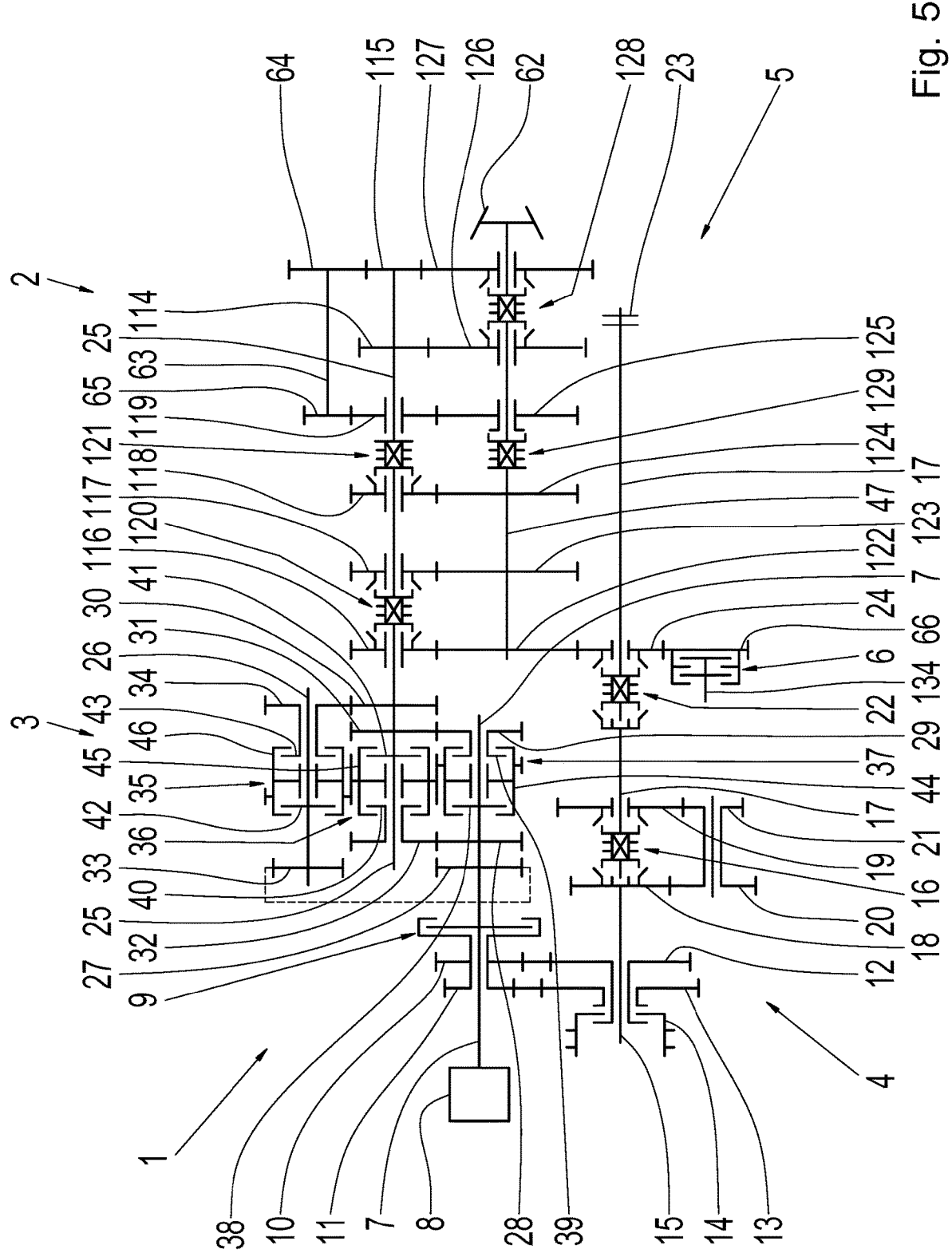

FIG. 5 schematically shows a fifth embodiment of an overall transmission 1 according to the invention, comprising a transmission assembly 2 according to the invention, a splitter transmission 3 and a PTO shaft transmission, which consists of a PTO shaft transmission module 4 and a ground-speed PTO shaft transmission module 5. The overall transmission 1 further comprises a power shift element 6. The overall drive 1 depicted is designed, for example, for use in an agricultural machine (not shown). The transmission assembly 2 represents a synchromesh transmission 2 within the overall transmission 1. The overall transmission 1, shown by way of example in FIG. 5, differs from the overall transmission 1 shown in FIG. 2 solely as a result of the design of the synchromesh transmission 2.

The transmission assembly 2 according to the invention designed as a synchromesh transmission 2 comprises, for example, the torque input shaft 25 and the torque output shaft 47. Input fixed gears 114 and 115 as well as input idler gears 116, 117 and 118 are arranged on the torque input shaft 25. The input idler gears 116 and 117 in this case are associated pairwise with a shared synchronizable gear shift packet 120, via the actuation of which one or none of the input fixed gears 116 and 117 is selectively operably couplable to the torque input shaft 25. The input idler gear 118 is associated with a single synchronizable shift element 121, via the actuation of which the input idler gear 118 is or is not selectively couplable to the torque input shaft 25. Output fixed gears 122 123 and 124, as well as output idler gears 125, 126 and 127 are arranged on the torque output shaft 47. One or none of the output idler gears 126 and 127 is selectively operatively couplable to the torque output shaft 47 via actuation of the gear shift packet 128. The output idler gear 125 is associated with a shift element 129, which is designed as a sliding collar 119 and which is not synchronizable. As is further indicated in FIG. 5, the output idler gear 125 meshes with input idler gear 119, which also fulfills a function as intermediate gear 119. Thus, since the shift element 129, for example, is not synchronizable, it can only be actuated if both the torque output shaft 47, as well as the input idler gear 119 or the intermediate gear 119 transmits no torque. The synchromesh transmission 2 could otherwise be damaged.

Thus, the synchromesh transmission 2, via input fixed gears 114 and 115, the input idler gears 116, 117 and 118, the output fixed gears 122, 123 and 124 as well as the output idler gears 126 and 127, enables the representation of a total of five different torque transmission paths, which corresponds to five different synchronous gears. The gear shift packets 121 and 128 are structurally identical to the previously described gear shift packets 16 and 22. One output 62 of the torque output shaft 47 is designed as a bevel wheel gear 62 and is connected, for example, to a driveable rear axle (not shown) of the agricultural machine. The synchromesh transmission 2 further comprises a double gear 63 having a first gear ring 64 and a second gear ring 65, wherein a diameter of the first gear ring 64 in relation to a diameter of the second gear ring 65 is designed in such a way that an additional torque transmission path is achievable with a crawling-like reduction of an input speed. The first gear ring 64, for example, meshes with an intermediate gear 119 and the second gear ring 65 meshes with the input idler gear 115.

The additional torque transmission path, which extends, for example, from the torque input shaft 25 via the input fixed gear 115, the double gear 63, the intermediate gear 119 and the output idler gear 125 to the torque output shaft 47, is implemented when the gear shift packet 129 is actuated in such a way that an operative coupling of the output idler gear 125 with the torque output shaft 47 is established. This additional torque transmission path represents a crawling gear.

The double gear 63 is designed, for example, in such a way that it axially bridges the input fixed gear 114. This means, the double gear 63 meshes with the gears adjacent to the input idler gear 114, namely, the input fixed gear 115 and the intermediate gear 119, but not with the input idler gear 114, since it bridges or axially straddles said input idler gear 114. Thus, the double gear 63 meshes with two non-adjacent gears.

In this case as well, it should be emphasized that, instead of to a splitter transmission 3, a PTO shaft transmission module 4 and a ground-speed PTO shaft transmission module 5, the transmission assembly 2 according to the invention, alternatively to the representation shown in FIG. 5, may also be coupled to only one single or to only two of the aforementioned transmission units, i.e., to the splitter transmission 3, to the PTO shaft transmission module 4 or to the ground-speed PTO shaft transmission module 5. It is also possible and preferred, to combine the transmission assembly 2 according to the invention with one or multiple transmission units other than the three aforementioned transmission units to form an overall transmission, for example, with a reversing gear unit. However, the use of the transmission assembly 2 alone with no additional transmission units in a vehicle is also possible and preferred.

Figure 6:
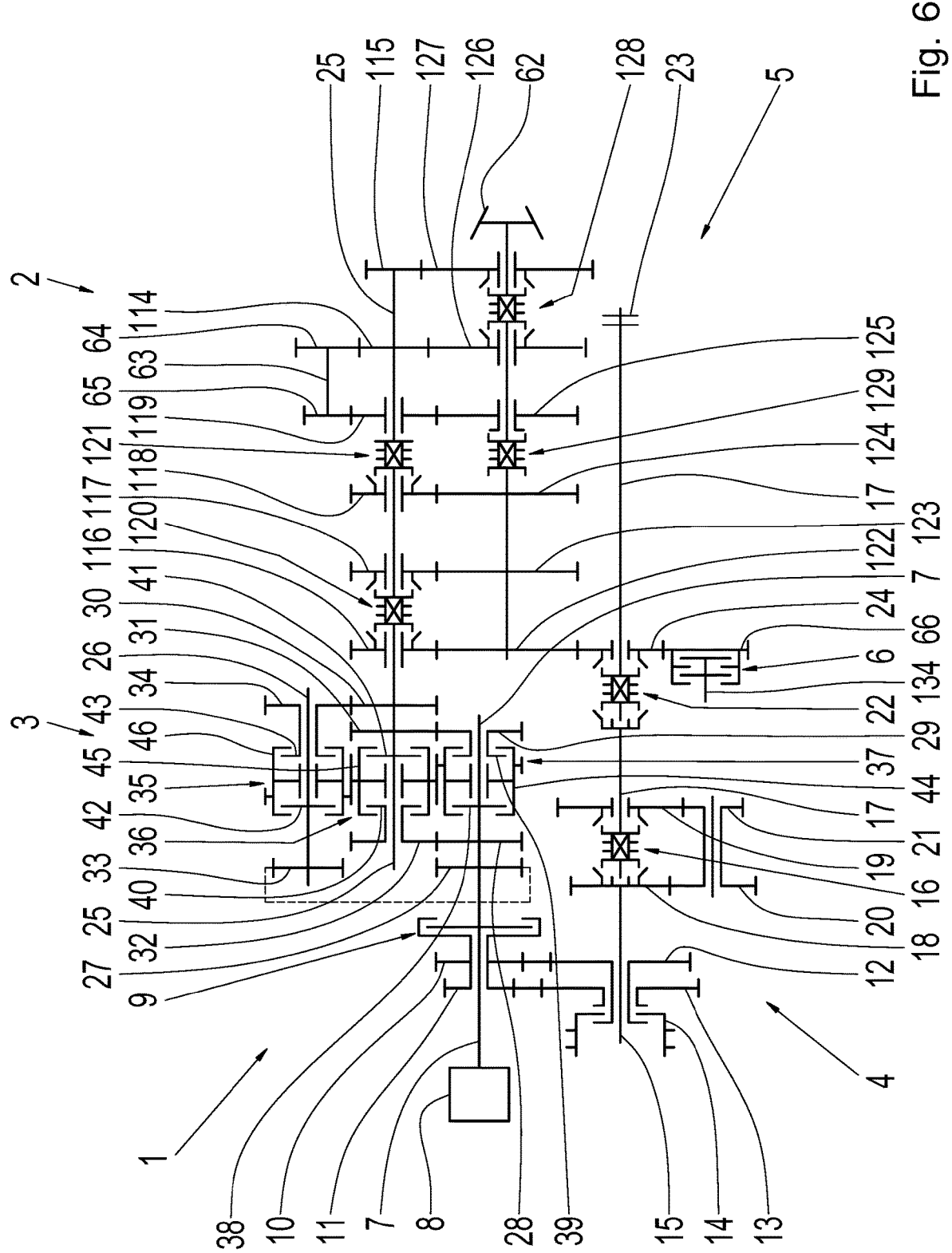

FIG. 6 schematically shows a sixth embodiment of an overall transmission 1 according to the invention, comprising a transmission assembly 2 according to the invention, a splitter transmission 3 and a PTO shaft transmission, which consists of a PTO shaft transmission module 4 and a ground-speed PTO shaft transmission module 5. The overall transmission 1 further comprises a power shift element 6. The overall drive 1 depicted is designed, for example, for use in an agricultural machine (not shown). The transmission assembly 2 represents a synchromesh transmission 2 within the overall transmission 1. The overall transmission 1 shown by way of example in FIG. 5 differs from the overall transmission 1 shown in FIG. 5 as a result of the design of the synchromesh transmission 2, insofar as the double gear 63 does not mesh with the intermediate gear 112 and the input fixed gear 115, but meshes with the intermediate gear 119 and the input fixed gear 114. Moreover, the double gear 63 according to the example of FIG. 6 is not designed in such a way that it bridges or axially straddles a input idler gear, input fixed gear, output idler gear or output fixed gear. Instead, the intermediate gear 119 and the input fixed gear 114, with which the double gear 63 meshes, are directly adjacent to one another.

An additional torque transmission path, which extends, for example, from the torque input shaft 25 via the input fixed gear 114, the double gear 63, the intermediate gear 119 and the output idler gear 125 to the torque output shaft 47, is implemented when the shift element 129 is actuated in such a way that an operative coupling of the output idler gear 125 with the torque output shaft 47 is established. This additional torque transmission path represents a crawling gear.

In this case as well, it should be emphasized that, instead of to a splitter transmission 3, a PTO shaft transmission module 4 and a ground-speed PTO shaft transmission module 5, the transmission assembly 2 according to the invention, alternatively to the representation shown in FIG. 6, may also be coupled to only one single or to only two of the aforementioned transmission units, i.e., to the splitter transmission 3, to the PTO shaft transmission module 4 or the ground-speed PTO shaft transmission module 5. It is also possible and preferred, to combine the transmission assembly 2 according to the invention with one or multiple transmission units other than the three aforementioned transmission units to form an overall transmission, for example, with a reversing gear unit. However, the use of the transmission assembly 2 alone with no additional transmission units in a vehicle is also possible and preferred.

Figure 7:
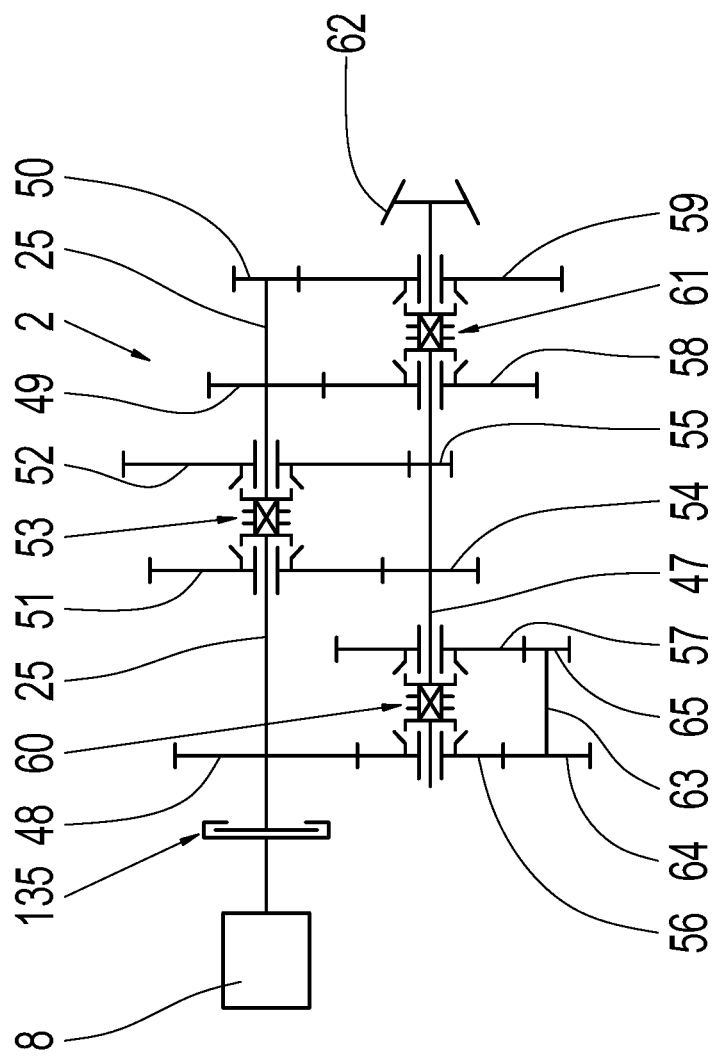

FIG. 7 schematically shows a possible embodiment of a transmission assembly 2 according to the invention as a stand-alone synchromesh transmission 2 with no additional upstream or downstream transmission units in a utility vehicle not shown. The synchromesh transmission of FIG. 7 corresponds to the synchromesh transmission 2 of FIG. 1. Owing to the fact that no splitter transmission and no other transmission units are connected upstream of the synchromesh transmission 2, the drive unit 8 drives the torque inputs shaft 25 directly, for example. In addition, a power-shiftable main clutch 135 is operatively connected between the drive unit 8 and the synchromesh transmission 2.

Figure 8:
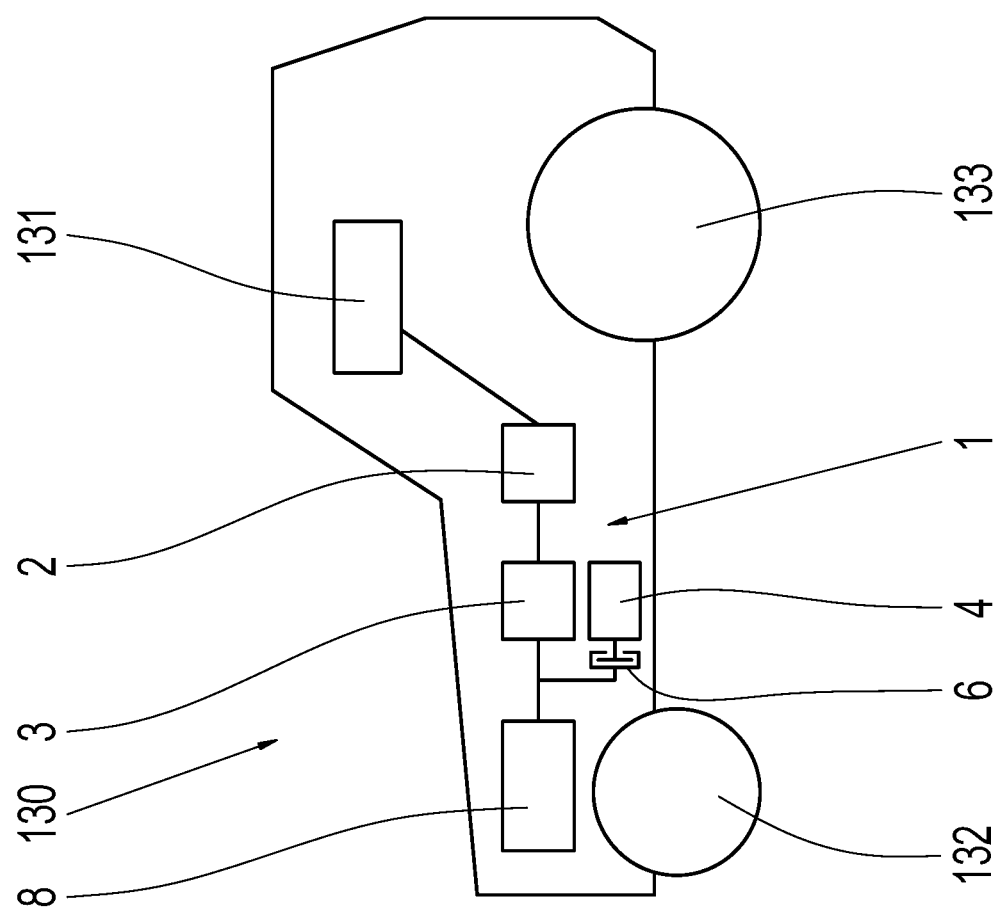

FIG. 8 schematically shows an agricultural machine 130 having an overall transmission 1 according to the invention. The overall transmission 1 consists, for example, of a transmission assembly 2 according to the invention, a splitter transmission 3, PTO shaft transmission module 4, a ground-speed PTO shaft transmission module 5, a power shift element 6 and a reversing gear 131. The transmission assembly 2 according to the invention is designed, for example, as a synchromesh transmission 2 and is operatively connected to wheels 132 and 133 of the agricultural machine 130 via an output not shown. An internal combustion engine 8, for example, serves as a drive unit 8.

LIST OF REFERENCE NUMERALS 1 overall transmission
2 transmission assembly, synchromesh transmission
3 splitter transmission
4 PTO shaft transmission module
5 ground-speed PTO shaft transmission module
6 power shift element
7 drive shaft
8 drive unit, internal combustion engine
9 power shift element, wet multi-plate clutch
10 idler gear
11 idler gear
12 idler gear
13 idler gear
14 sliding collar
15 PTO shaft
16 synchronizable gear shift packet
17 additional PTO shaft
18 fixed gear
19 fixed gear
20 idler gear
21 idler gear
22 gear shift packet
23 PTO shaft stub
24 movable wheel
25 torque input shaft
26 countershaft
27 fixed gear
28 fixed gear
29 idler gear
30 fixed gear 31 fixed gear
32 fixed gear
33 fixed gear
34 idler gear
35 power-shiftable multi-plate clutch
36 power-shiftable multi-plate clutch
37 power-shiftable multi-plate clutch
38 inner multi-plate support
39 inner multi-plate support
40 inner multi-plate support
41 inner multi-plate support
42 inner multi-plate support
43 inner multi-plate support
44 clutch bell
45 clutch bell
46 clutch bell
47 torque output shaft
48 input fixed gear
49 input fixed gear
50 input fixed gear
51 input fixed gear
52 input fixed gear
53 synchronizable gear shift packet
54 output fixed gear
55 output fixed gear
56 output idler gear, intermediate gear
57 output idler gear
58 output idler gear
59 output idler gear
60 synchronizable gear shift packet
61 synchronizable gear shift packet
62 output of the torque output shaft, bevel wheel gear
63 double gear
64 first gear ring of the double gear
65 second gear ring of the double gear
66 fixed gear
68 input fixed gear
69 input idler gear
70 input idler gear
71 input idler gear
72 synchronizable gear shift packet
73 synchronizable gear shift packet
74 output fixed gear
75 output fixed gear
76 output fixed gear
77 output fixed gear
78 output idler gear, intermediate gear
79 output idler gear
80 synchronizable gear shift packet
81 output fixed gear
82 input fixed gear
83 input fixed gear
84 input fixed gear
85 intermediate gear
86 input idler gear
87 input idler gear
88 synchronizable gear shift packet
89 output fixed gear
90 output fixed gear
91 output idler gear
92 output idler gear
93 output idler gear
94 output idler gear
95 synchronizable gear shift packet
96 synchronizable gear shift packet
97 input fixed gear
98 input fixed gear
99 input fixed gear
100 input idler gear, intermediate gear
101 input idler gear
102 input idler gear
103 synchronizable gear shift packet
104 output fixed gear
105 output fixed gear
106 output fixed gear
107 output idler gear
108 output idler gear
109 output idler gear
110 output idler gear
111 synchronizable gear shift packet
111 synchronizable gear shift packet
113 input idler gear, intermediate gear
114 input fixed gear
115 input fixed gear
116 input idler gear
117 input idler gear
118 input idler gear
119 input idler gear, intermediate gear
120 synchronizable gear shift packet
121 synchronizable gear shift packet
122 output fixed gear
123 output fixed gear
124 output fixed gear
125 output idler gear
126 output idler gear
127 output idler gear
128 synchronizable gear shift packet
129 non-synchronizable shift element, sliding collar
130 agricultural machine
131 reversing gear
132 wheel of the agricultural machine
133 wheel of the agricultural machine
134 second output
135 main clutch

The invention claimed is:

1. An overall transmission for an agricultural machine, the overall transmission comprising:
a splitter transmission;
a transmission assembly comprising a torque input shaft and a torque output shaft;
input idler gears, input fixed gears and shift elements, each of which are associated with an input idler gear, being arranged on the torque input shaft, the input idler gears being rotatable with respect to the torque input shaft, and the input fixed gears being continually rotationally fixed to the torque input shaft;
output idler gears, output fixed gears and shift elements, each of which are associated with an output idler gear, being arranged on the torque output shaft;
the output idler gears and the output fixed gears each meshing with either one of said input idler gears or one of said input fixed gears;
the input idler gears being operably couplable to the torque input shaft via actuation of the shift elements associated with the input idler gears;
the output idler gears being operably couplable to the torque output shaft via actuation of the shift elements associated with the output idler gears, such that a plurality of different torque transmission paths, from the torque input shaft to the torque output shaft, are implementable;
an additional torque transmission path being implementable, and the additional torque transmission path running from the torque input shaft via a double gear to the torque output shaft; and the double gear either meshing with an additional input idler gear and one of said input fixed gears or meshing with two of said output idler gears.

2. The overall transmission according to claim 1, wherein the double gear has a first gear ring and a second gear ring, a diameter of the first gear ring, in relation to a diameter of the second gear ring, is designed such that a crawling-like reduction of an input speed occurs when the additional torque transmission path is implemented.

3. The overall transmission according to claim 1, wherein the additional torque transmission path also extends through an intermediate gear, which is arranged as an idler gear on either the torque input shaft or on the torque output shaft and either meshes with the first gear ring or with the second gear ring of the double gear.

4. The overall transmission according to claim 3, wherein either one of said input idler gears or one of said output idler gears is utilized as the intermediate gear.

5. The overall transmission according to claim 3, wherein one of said shift elements, which is associated with either one of said input idler gears or one of said output idler gears that meshes with the intermediate gear, is not synchronizable.

6. The overall transmission according to claim 1, wherein the double gear axially bridges one of:
   at least one of said input idler gears,
   at least one of said output idler gears,
   at least one of said input fixed gears, and
   at least one of said output fixed gears.

7. The overall transmission according to claim 1, wherein the shift elements associated with the input idler gears are synchronizable and the shift elements associated with the output idler gears are synchronizable.

8. The overall transmission according to claim 1, wherein at least one gear shift packet, which structurally combines shift elements of at least one of adjacent said input idler gears and adjacent said output idler gears, is arranged on at least one of the torque input shaft and the torque output shaft.

9. The overall transmission according to claim 1, wherein a first output of the transmission assembly is operatively connectable to a drivable rear axle of a vehicle.

10. The overall transmission according to claim 1, wherein a second output of the transmission assembly is shiftable via a power shift element.

11. The overall transmission according to claim 10, wherein the transmission assembly is designed such that the second output has an output speed that differs by a transmission ratio from the first output.

12. The overall transmission according to claim 1, wherein the overall transmission further comprises a PTO shaft transmission, which has a shared PTO shaft stub for a PTO shaft operation and a ground-speed PTO shaft operation.

13. An agricultural machine in combination with an overall transmission comprising a splitter transmission;
   a transmission assembly comprising a torque input shaft and a torque output shaft;
      input idler gears, input fixed gears and shift elements, each of which are associated with an input idler gear, being arranged on the torque input shaft, the input idler gears being rotatable with respect to the torque input shaft, and the input fixed gears being continually rotationally fixed to the torque input shaft;
      output idler gears, output fixed gears and shift elements, each of which are associated with an output idler gear, being arranged on the torque output shaft;
      the output idler gears and the output fixed gears each meshing with either one of said input idler gears or one of said input fixed gears;
      the input idler gears being operably couplable to the torque input shaft via actuation of the shift elements associated with the input idler gears;
      the output idler gears being operably couplable to the torque output shaft via actuation of the shift elements associated with the output idler gears, such that a plurality of different torque transmission paths from the torque input shaft to the torque output shaft are implementable;
      an additional torque transmission path being implementable, the additional torque transmission path running from the torque input shaft via a double gear to the torque output shaft; and
      the double gear either meshing with an additional input idler gear and one of said input fixed gears or meshing with two of said output idler gears.

14. An overall transmission for an agricultural machine, the overall transmission comprising:
   a splitter transmission and a synchromesh transmission;
   the synchromesh transmission comprising:
      a one-piece torque input shaft and a torque output shaft, and the torque input shaft being drivingly connected to the splitter transmission;
      the torque input shaft of the synchromesh transmission supporting at least first and second input idler gears, at least one input fixed gear, and a first double acting shift element, the first double acting shift element being actuatable, in a first axial direction, to couple the first input idler gear to the torque input shaft and being actuatable, in an opposite second axial direction, to couple the second input idler gear to the torque input shaft, the first and the second input idler gears being rotatable with respect to the torque input shaft, and the at least one input fixed gear being continually rotationally fixed to the torque input shaft;
      the torque output shaft of the synchromesh transmission supporting at least first and second output idler gears, at least two output fixed gears, and a second double acting shift element, and the second double acting shift element being actuatable, in a first direction, to couple the first output idler gear to the torque output shaft and being actuatable, in an opposite second axial direction, to couple the second output idler gear to the torque output shaft;
      each one of the at least first and the second input idler gears meshing with a respective one of the at least two output fixed gears, and the at least one input fixed gear meshing with one of the first and the second output idler gears;
      the first double acting shift element and the second double acting shift element being selectively actuatable to implement a plurality of different torque transmission paths from the torque input shaft to the torque output shaft;
      one of the plurality of different torque transmission paths extending from the torque input shaft, via a double gear, to the torque output shaft, and the double gear having two gearwheels, and the double gear having either:

each of the two gearwheels meshing with a respective one of the first and the second output idler gears, or a first one of the two gearwheels meshing with an additional input idler gear and a second one of the two gearwheels meshing with the at least one input fixed gear.

\* \* \* \* \*